(12) United States Patent
Hashida

(10) Patent No.: US 10,649,594 B2
(45) Date of Patent: May 12, 2020

(54) CAPACITIVE INPUT DEVICE HAVING TWO DETECTION MODES

(71) Applicant: Alps Alpine Co., Ltd., Tokyo (JP)

(72) Inventor: Junji Hashida, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 236 days.

(21) Appl. No.: 15/821,471

(22) Filed: Nov. 22, 2017

(65) Prior Publication Data

US 2018/0095562 A1  Apr. 5, 2018

Related U.S. Application Data

(63) Continuation of application No. PCT/JP2016/066728, filed on Jun. 6, 2016.

(30) Foreign Application Priority Data

Aug. 18, 2015  (JP) ................................. 2015-161162

(51) Int. Cl.
  *G06F 3/045*  (2006.01)
  *G06F 3/044*  (2006.01)
  *G06F 3/041*  (2006.01)

(52) U.S. Cl.
  CPC ............ *G06F 3/044* (2013.01); *G06F 3/0416* (2013.01); *G06F 2203/04101* (2013.01)

(58) Field of Classification Search
  CPC .................. G06F 3/044; G06F 3/0416; G06F 2203/04101
  USPC ........................................................ 345/174
  See application file for complete search history.

(56) References Cited

U.S. PATENT DOCUMENTS

| 2008/0129317 | A1 | 6/2008 | Oba |
| 2008/0302583 | A1 | 12/2008 | Tateishi |
| 2015/0261251 | A1* | 9/2015 | Shepelev ................ G06F 3/044 345/174 |
| 2016/0085336 | A1 | 3/2016 | Kim et al. |
| 2017/0060329 | A1* | 3/2017 | Yoon ..................... G06F 3/0416 |

(Continued)

FOREIGN PATENT DOCUMENTS

| JP | 2008-140130 | 6/2008 |
| JP | 2015-109086 | 6/2015 |
| WO | 2006-035966 | 4/2006 |

OTHER PUBLICATIONS

International Search Report from International Application No. PCT/JP2016/066728 dated Jul. 5, 2016.

*Primary Examiner* — Jonathan M Blancha
(74) *Attorney, Agent, or Firm* — Beyer Law Group LLP

(57) ABSTRACT

First and second substrates are disposed to face each other and allowed to approach each other. A plurality of first electrodes are formed on the first substrate. A plurality of second electrodes are formed on the second substrate and face the respective first electrodes. A facing electrode pair is constituted by each of the first electrodes and a corresponding one of the second electrodes. A switching unit causes each of the first electrodes and each of the second electrodes to be connected to a driving unit or a detecting unit and switches between a first detection state in which a distance change between each of the first electrodes and a corresponding one of the second electrodes is detected and a second detection state in which the coordinates of a position that an operating body approaches or touches are determined in accordance with detection outputs from the facing electrode pairs.

18 Claims, 4 Drawing Sheets

(56) References Cited

U.S. PATENT DOCUMENTS

2017/0060340 A1\* 3/2017 Chen ................... G06F 3/0412
2018/0095582 A1\* 4/2018 Hwang ................ G06F 3/0412

\* cited by examiner

CAPACITIVE INPUT DEVICE HAVING TWO DETECTION MODES

CLAIM OF PRIORITY

This application is a Continuation of International Application No. PCT/JP2016/066728 filed on Jun. 6, 2016, which claims benefit of Japanese Patent Application No. 2015-161162 filed on Aug. 18, 2015. The entire contents of each application noted above are hereby incorporated by reference.

BACKGROUND OF THE INVENTION

1. Field of the Invention

The present invention relates to a capacitive input device that can acquire positional information of a finger or the like when an operator brings the finger or the like close to a top panel or touches the same with the finger or the like and that can further detect a pressing force applied to the top panel and determine the magnitude of the pressing force.

2. Description of the Related Art

Examples of a capacitive input device detecting a position that an operating body such as a finger or a hand of an operator touches or approaches include a device that has a plurality of electrodes arranged in the X direction and a plurality of electrodes arranged in the Y direction on a substrate. In this device, the plurality of electrodes arranged in the X direction (hereinafter, referred to as an electrode group A) are electrically connected to each other, and the plurality of electrodes arranged in the Y direction (hereinafter, referred to as an electrode group B) are also electrically connected to each other. The electrode group A and the electrode group B, which are electrically insulated from each other via an insulating layer, intersect each other. In such a configuration, for example, if the electrode group A is configured to function as driving electrodes and the electrode group B is configured to function as detecting electrodes, a capacitance is formed between an electrode in the electrode group A and an electrode in the electrode group B. When an operating body touches or approaches a detecting electrode, coupling is formed between the capacitance formed between an electrode in the electrode group A and an electrode in the electrode group B and a capacitance formed between each electrode and the operating body, and positional information of the operating body is acquired in accordance with the change in the coupled capacitance.

In the input device according to Japanese Unexamined Patent Application Publication No. 2008-140130, conductive films are formed on respective upper and lower surfaces of a substrate. A plurality of electrodes arranged in a matrix are disposed on the upper conductive film, and a plurality of electrodes arranged so as to correspond to the plurality of electrodes disposed on the upper conductive film are disposed on the lower conductive film. The plurality of electrodes disposed on the lower conductive film are electrically connected to each other. Further, the lower conductive film constitutes the ground and functions as a shield layer that reduces an influence of radiation noise from, for example, under the lower conductive film on a sensing unit. In this input device, when an operating body touches or approaches any of the electrodes on the upper conductive film, capacitance formed between the electrodes that the operating body touches or approaches and the ground changes, and positional information of the operating body can be acquired in accordance with the change in the capacitance.

Nowadays, it is being required that a capacitive input device include a function that detects whether an operator applies a pressing force to a top panel in addition to a function that detects a position on the top panel approached or touched by an operating body.

In view of the foregoing, an existing capacitive input device, which has electrode groups arranged in respective X and Y directions on a substrate, may employ a method to detect whether a pressing force is applied by deducing a capacitance change in accordance with a change in a contact area of an electrode that varies depending on the magnitude of the force applied to the top panel. However, a change in the posture of the operating body, for example, a finger in an upright position or a lying position, causes the contact area of an electrode to change. Thus, using such a method is not preferable from the viewpoint of certainty and reliability of detection.

On the other hand, the input device according to Japanese Unexamined Patent Application Publication No. 2008-140130 is considered to be able to detect whether a pressing force is applied to the top panel in accordance with a change in the capacitance between the electrodes on the upper conductive film and the ground. This is because the upper and lower conductive films move closer to each other in response to the pressing force applied to the top panel.

However, in the input device according to Japanese Unexamined Patent Application Publication No. 2008-140130, the upper and lower conductive films are disposed with a very small spacing therebetween, resulting in a large capacitance between the electrodes and the ground. Thus, when an operating body approaches or touches the top panel, the amount of change in capacitance relative to the initial value is small, and it is difficult to detect the position of the operating body, especially when the operating body approaches the top panel without touching it, which is a problem. In contrast, if the spacing between the upper and lower conductive films is increased, the change in capacitance decreases when the spacing between the conductive films changes. Thus, it is difficult to detect the pressing force separately from the position detection of the operating body.

SUMMARY OF THE INVENTION

The present invention provides a capacitive input device that can acquire accurate positional information of an operating body when the operating body approaches or touches a top panel and that can further detect with certainty a pressing force applied to the top panel and determine the magnitude of the pressing force.

In view of the foregoing, a capacitive input device according to the present invention includes a first substrate and a second substrate disposed to face each other and allowed to approach each other; a plurality of first electrodes formed on the first substrate; a plurality of second electrodes formed on the second substrate and facing the plurality of respective first electrodes; facing electrode pairs, each of which is constituted by a corresponding one of the first electrodes and a corresponding one of the second electrodes that faces the corresponding one of the first electrodes; and a switching unit causing each of the first electrodes and each of the second electrodes to be connected to a driving unit or a detecting unit. The switching unit switches between a first detection state in which a change in a distance between each of the first electrodes and a corresponding one of the second electrodes that faces the first electrode is detected and a second detection state in which coordinates of a position that an operating body approaches or touches are determined in accordance with detection outputs from the facing electrode pairs.

Thus, it is possible to provide the capacitive input device that enables sensitive and accurate detection in each of the detection states, without increasing the spacing between the first substrate and the second substrate, by disposing the plurality of facing electrode pairs, each of which is constituted by two electrodes facing each other, and by switching between the first detection state in which whether a pressing force is applied to an electrode and the magnitude of the pressing force are determined and the second detection state in which a position that an operating body approaches or touches is detected.

In the capacitive input device according to one embodiment of the present invention, it is preferable that, in the first detection state, either the plurality of first electrodes or the plurality of second electrodes be caused to be connected to the driving unit, and the plurality of first electrodes or the plurality of second electrodes not connected to the driving unit be caused to be connected to the detecting unit, and, in the second detection state, the first electrode and the second electrode that constitute each of the facing electrode pairs be caused to be connected to the driving unit or the detecting unit.

Thus, it is possible to provide the capacitive input device that achieves both the detection accuracy in the first detection state and the detection accuracy in the second detection state.

In the capacitive input device according to one embodiment of the present invention, it is preferable that, in the first detection state, simultaneously for all the facing electrode pairs, either the first electrodes or the second electrodes be caused to be connected to the driving unit, and the first electrodes or the second electrodes not connected to the driving unit be caused to be connected to the detecting unit.

Thus, whether a pressing force is applied and the magnitude of the pressing force can be determined with certainty.

In the capacitive input device according to one embodiment of the present invention, it is preferable that, in the first detection state, individually for each of the facing electrode pairs, either the first electrode or the second electrode be caused to be connected to the driving unit, and the first electrode or the second electrode not connected to the driving unit be caused to be connected to the detecting unit.

Thus, power consumption can be reduced compared with the case in which a driving voltage is simultaneously applied to all the facing electrode pairs.

In the capacitive input device according to one embodiment of the present invention, it is preferable that, in the second detection state, both the first electrode and the second electrode of any of the facing electrode pairs be caused to be connected to the driving unit, that both the first electrodes and the second electrodes of the other facing electrode pairs be caused to be connected to the detecting unit, and that the coordinates be determined in accordance with a change in mutual capacitance between the first electrode and the second electrode connected to the driving unit and the first electrodes and the second electrodes connected to the detecting unit.

Because an electrode pair, as a unit, is connected to the driving unit or the detecting unit, highly sensitive and accurate detection is enabled.

In the capacitive input device according to one embodiment of the present invention, it is preferable that, in the second detection state, the facing electrode pair for which both the first electrode and the second electrode are caused to be connected to the driving unit be changed in succession among the facing electrode pairs.

Thus, detection is enabled over the whole area in which the electrodes are disposed on the first substrate and the second substrate.

In the capacitive input device according to one embodiment of the present invention, it is preferable that, in the second detection state, both the first electrode and the second electrode of any of the facing electrode pairs be caused to be connected to the driving unit and the detecting unit, and that the coordinates be determined in accordance with a change in self capacitance detected by the detecting unit.

Thus, detection may be simplified because, in contrast to the detection using the mutual capacitance, detection using a facing electrode pair other than the facing electrode pair connected to the driving unit need not be performed, and the facing electrode pairs need not be switched in succession.

In the capacitive input device according to one embodiment of the present invention, it is preferable that the facing surfaces of the first electrode and the second electrode constituting each of the facing electrode pairs have the same planar shape.

Thus, rapid and certain detection is possible because, by using the whole area corresponding to the electrodes, an operating body approaching, touching, or pressing the electrodes can be detected, and the magnitude of the pressing force can be determined.

In the capacitive input device according to one embodiment of the present invention, it is preferable that the first substrate and the second substrate face each other with an elastic member sandwiched between the first substrate and the second substrate.

This enables a capacitance to be maintained constant when no operation is performed by the operating body, leading to stable detection processing.

DESCRIPTION OF THE PREFERRED EMBODIMENTS

Hereinafter, a capacitive input device according to an embodiment of the present invention will be described in detail with reference to the drawings. A capacitive input device according to this embodiment is an optical-transmissive-type device and can be used for a cellular phone, a portable information terminal, a household electrical appliance, or a vehicle-mounted electronic apparatus. The capacitive input device according to the present invention is not limited to an optical-transmissive-type device and can be constituted by a non-optical-transmissive-type device.

Figure 1:
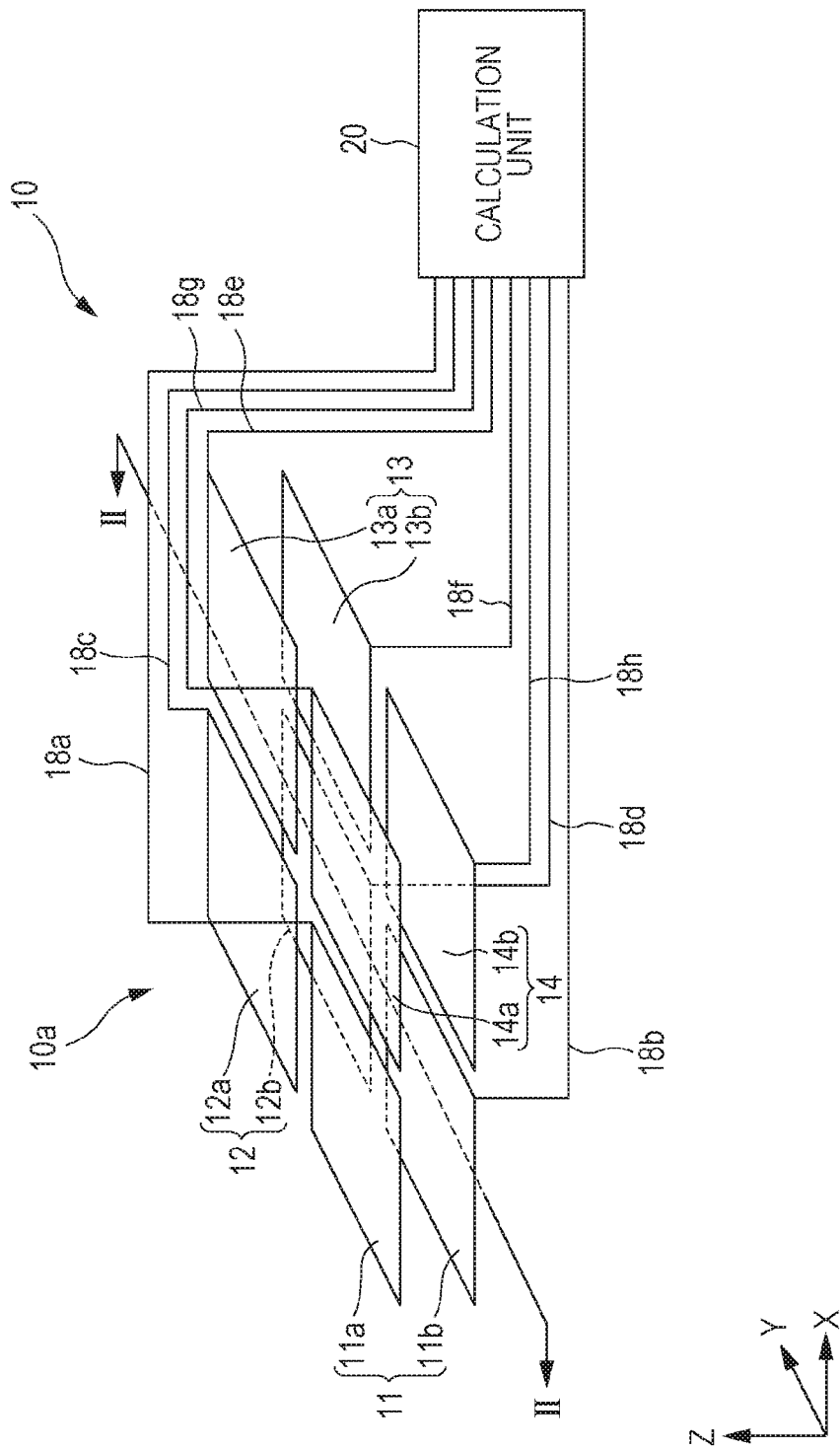
FIG. 1 depicts an electrode layout of a capacitive input device according to an embodiment of the present invention.
Figure 2:
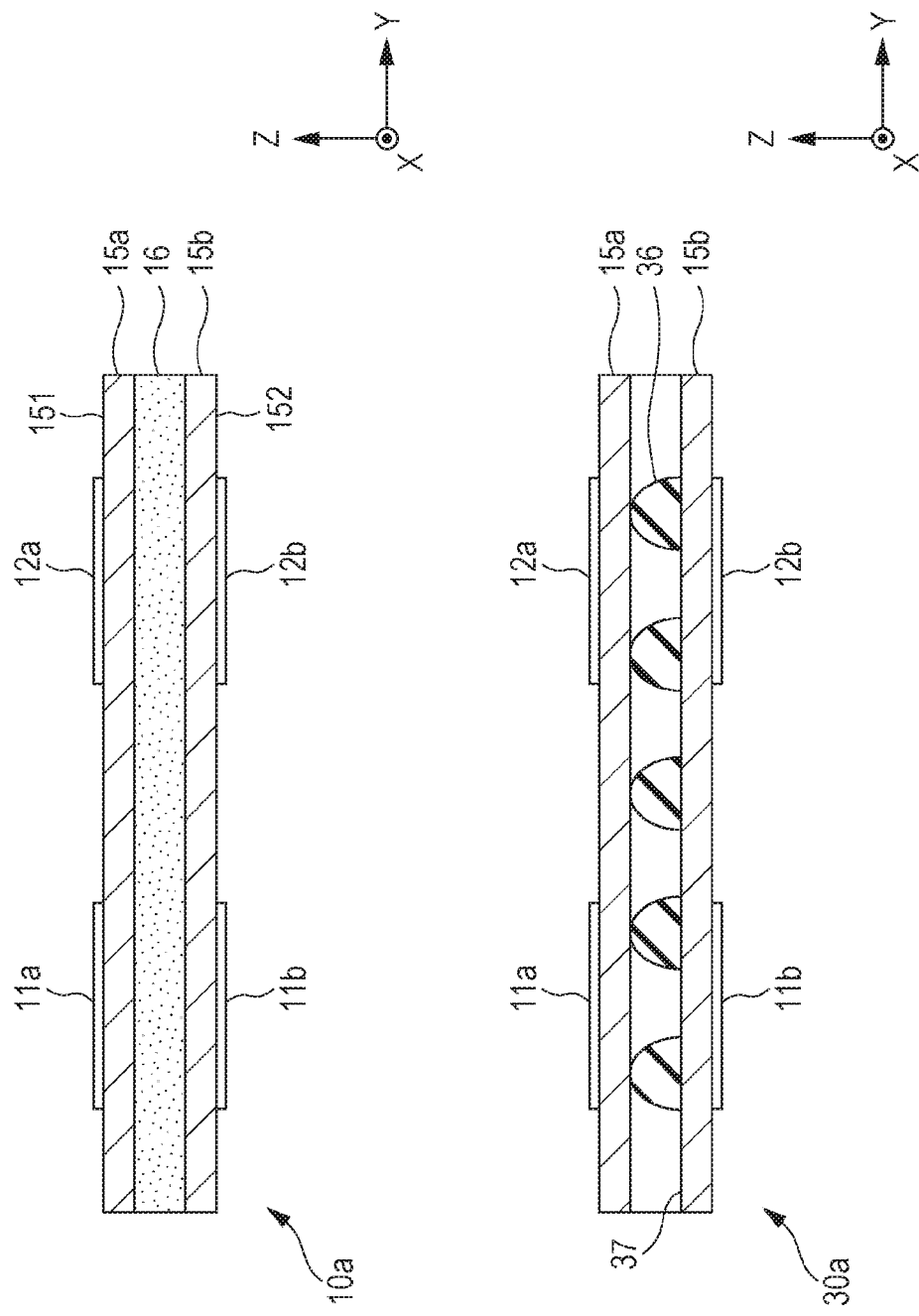
FIG. 2A is a cross sectional view depicting a structure of a sensing unit of the capacitive input device of FIG. 1.
FIG. 2B is a cross sectional view depicting a structure of a sensing unit of the capacitive input device according to a modification.
Figure 3:
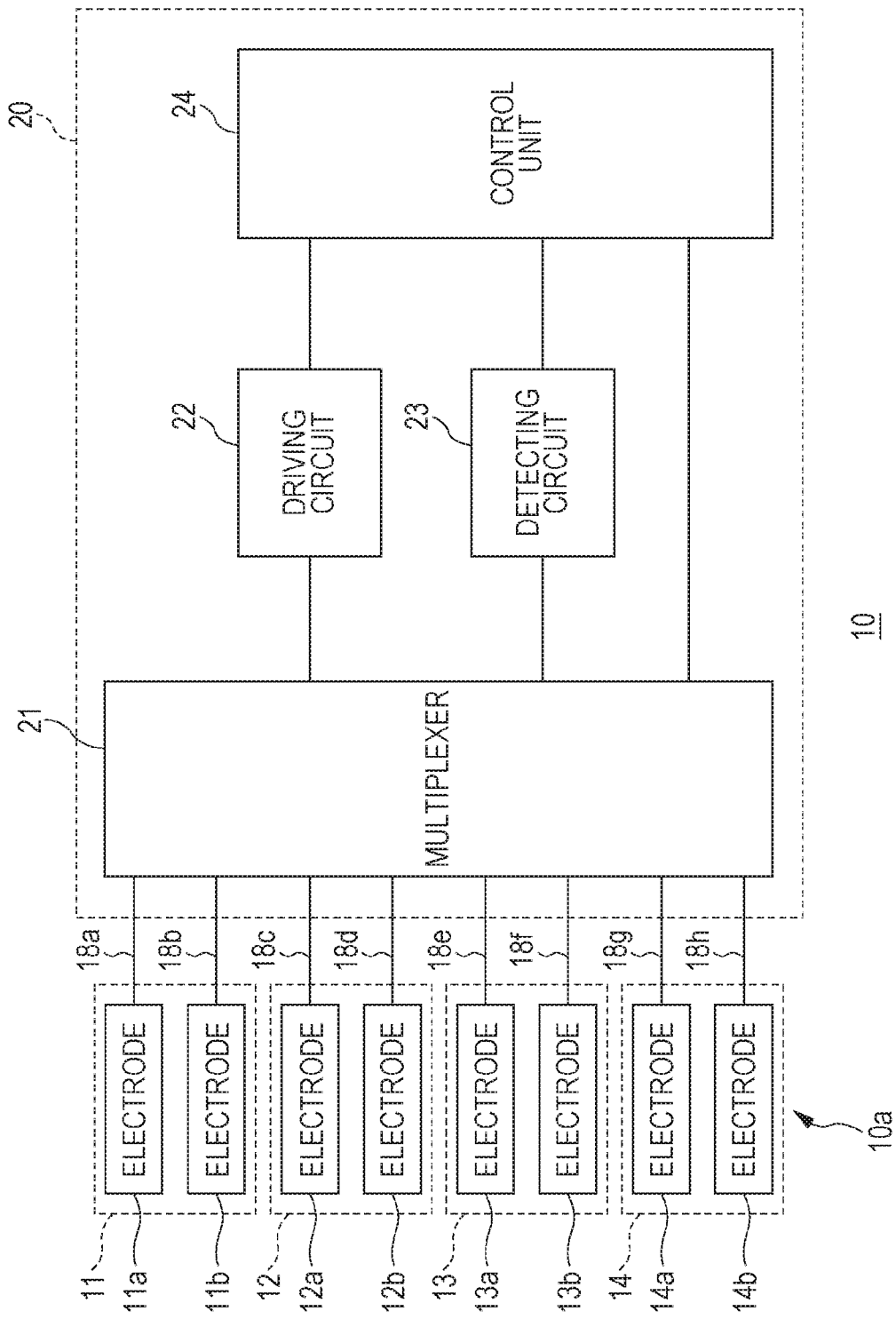
FIG. 3 is a functional block diagram of the capacitive input device of FIG. 1.

FIG. 1 depicts an electrode layout of a capacitive input device 10 according to this embodiment. FIG. 2A is a cross sectional view depicting a structure of a sensing unit 10a of the capacitive input device 10. FIG. 2B is a cross sectional view depicting a structure of a sensing unit 30a of the capacitive input device according to a modification. FIG. 3 is a functional block diagram of the capacitive input device 10. In FIG. 1, a first substrate 15a, an optically clear adhesive member 16, and a second substrate 15b are not shown. FIGS. 2A and 2B are cross sectional views taken along line II-II and viewed in the arrow direction in FIG. 1. X-Y-Z coordinates are depicted in each figure. The Z direction is the vertical direction, and the XY plane is a plane perpendicular to the Z direction.

In the following description, an operating body refers to a finger or a hand of an operator who operates the capacitive input device 10 or to a stylus.

As depicted in FIGS. 1 and 3, the capacitive input device 10 according to this embodiment includes the sensing unit 10a and a calculation unit 20.

As depicted in FIGS. 1 and 3, the sensing unit 10a includes four facing electrode pairs 11, 12, 13, and 14. The facing electrode pairs 11, 12, 13, and 14 each include a first electrode and a second electrode that face each other in the vertical direction (Z direction). Specifically, the facing electrode pair 11 includes a first electrode 11a, which is an upper electrode, and a second electrode 11b, which is a lower electrode, the facing electrode pair 12 includes a first electrode 12a, which is an upper electrode, and a second electrode 12b, which is a lower electrode, the facing electrode pair 13 includes a first electrode 13a, which is an upper electrode, and a second electrode 13b, which is a lower electrode, and the facing electrode pair 14 includes a first electrode 14a, which is an upper electrode, and a second electrode 14b, which is a lower electrode.

Although four facing electrode pairs are used in this embodiment, the number of the pairs can be changed in accordance with the size, detection accuracy, or other factors of the capacitive input device.

As depicted in FIG. 2A, the first electrodes 11a, 12a, 13a, and 14a are formed on an upper surface 151 of the first substrate 15a, which is a top panel, and arranged in a two-by-two matrix in plan view. The first electrodes 11a, 12a, 13a, and 14a are formed using a transparent conductive material, such as ITO (Indium Tin Oxide), SnO2, or ZnO, by using a thin film method such as sputtering or deposition. The second electrodes 11b, 12b, 13b, and 14b are formed on a lower surface 152 of the second substrate 15b so as to face the first electrodes 11a, 12a, 13a, and 14a, respectively, using a transparent conductive material, such as ITO, SnO2, or ZnO, by using a thin film method such as sputtering or deposition in a manner similar to the first electrodes 11a, 12a, 13a, and 14a.

The first electrodes 11a, 12a, 13a, and 14a and the second electrodes 11b, 12b, 13b, and 14b may be formed using an opaque conductive material, such as a metal layer, a silver paste, or a conductive nanowire.

As depicted in FIG. 1, the first electrodes 11a, 12a, 13a, and 14a and the second electrodes 11b, 12b, 13b, and 14b each have a square planar shape when viewed from above and have an equal area. Further, on the first substrate 15a and on the second substrate 15b, the positions and orientations of the first electrode and the second electrode, which face each other in each of the facing electrode pairs 11, 12, 13, and 14, are adjusted so that the first electrode and the second electrode overlap each other completely in the vertical direction.

The four first electrodes 11a, 12a, 13a, and 14a preferably have the same planar shape, and the four second electrodes 11b, 12b, 13b, and 14b also preferably have the same planar shape. The first electrode and the second electrode that constitute a facing electrode pair may have different planar shapes or similar planar shapes with different sizes as long as the first electrode and the second electrode face each other having an overlapping area larger than or equal to a predetermined area. The overlapping area larger than or equal to a predetermined area is an area that enables the distance between the first electrode and the second electrode that constitute a facing electrode pair to be determined and that enables the coordinates of a position that the operating body approaches or touches to be determined with certainty in accordance with a detection output from each facing electrode pair. Neither an area that produces too small a detection output nor an area that produces too large a capacitive coupling between an electrode and another electrode that does not constitute a facing electrode pair with the electrode, compared with a capacitive coupling between the electrode and another electrode that constitutes a facing electrode pair with the electrode, is preferable.

Further, the first electrode and the second electrode that constitute a facing electrode pair preferably face each other so that the overlapping area includes the center of the planar shape of the first electrode in the planar directions of the first substrate 15a and the second substrate 15b, that is, the directions that constitute the XY plane.

As depicted in FIGS. 1 and 2A, the first substrate 15a and the second substrate 15b have substantially the same planar area and are disposed so as to face each other in the vertical direction with the nonconductive optically clear adhesive (OCA) member 16, which is an elastic member, sandwiched therebetween. The elasticity of the optically clear adhesive member 16 allows the first substrate 15a and the second substrate 15b to approach each other. The first substrate 15a, which is made of plastic, for example, has sufficient elasticity so as to allow bending when pressed by a finger or a hand of an operator and to suppress deformation by only contact of the finger or the hand. The second substrate 15b is made of a material having hardness, such as plastic or glass, and fixed to a device, such as a liquid-crystal display panel, for which the capacitive input device 10 is used.

When a pressing force is applied to any of the first electrodes on the first substrate 15a in a downward direction, that is, toward the second substrate 15b, the first substrate 15a is bent, and the optically clear adhesive member 16 is compressed. Then, the first substrate 15a approaches the second substrate 15b. In contrast, once the pressing force that has been applied to the first substrate 15a is released, the first substrate 15a and the optically clear adhesive member 16 return to the initial states, and the spacing between the first substrate 15a and the second substrate 15b returns to the same magnitude as that before the pressing force is applied.

As depicted in FIG. 1 or FIG. 3, the first electrodes 11a, 12a, 13a, and 14a are connected to a multiplexer 21 of the calculation unit 20 via wiring lines 18a, 18c, 18e, and 18g, respectively. The wiring lines 18a, 18c, 18e, and 18g are formed on the upper surface 151 of the first substrate 15a by using ITO, a silver paste, or a conductive nanowire, for example.

The second electrodes 11b, 12b, 13b, and 14b are connected to the multiplexer 21 of the calculation unit 20 via wiring lines 18b, 18d, 18f, and 18h, respectively. The wiring lines 18b, 18d, 18f, and 18h are formed on the lower surface 152 of the second substrate 15b by using ITO, a silver paste, or a conductive nanowire, for example.

As depicted in FIG. 3, the calculation unit 20 includes the multiplexer 21, a driving circuit 22 as a driving unit, a detecting circuit 23 as a detecting unit, and a control unit 24. The multiplexer 21 and the control unit 24 constitute a switching unit.

The multiplexer 21 connects each of the first electrodes 11a, 12a, 13a, and 14a and each of the second electrodes 11b, 12b, 13b, and 14b to the driving circuit 22 or the detecting circuit 23 in accordance with an instruction signal from the control unit 24. Thus, the capacitive input device 10 is switched to either a first detection state or a second detection state. The order of switching between the first detection state and the second detection state and the time intervals between the switching, for example, are determined in advance in accordance with a specification and the like of the capacitive input device 10 and stored in a memory unit included in the control unit 24. Data related to the switching between the detection states, which will be described below, is also stored in the memory unit included in the control unit 24.

The multiplexer 21 performs, in accordance with control performed by the control unit 24, the switching between the first detection state and the second detection state after a time allocated to the present detection state has elapsed. A lapse of time is confirmed in accordance with an output signal from a clock unit included in the control unit 24.

Alternatively, each of the detection states may be maintained until a predetermined operation is performed by an operator, and switching to the other detection state may be performed when the predetermined operation is performed. Thus, the present detection state may be maintained unless the predetermined operation is performed. Efficient detection processing is made possible in this way.

In addition, one of the detection states may be maintained until the predetermined operation is performed whereas the other detection state may be switched after the predetermined time has elapsed regardless of whether the operation is performed.

When the capacitive input device 10 is switched to the first detection state, in accordance with the control performed by the control unit 24, the multiplexer 21 connects the first electrodes 11a, 12a, 13a, and 14a to the driving circuit 22 and connects the second electrodes 11b, 12b, 13b, and 14b to the detecting circuit 23. In the first detection state, a rectangular-wave driving voltage having a fixed period is applied simultaneously to all the first electrodes 11a, 12a, 13a, and 14a, which function as driving electrodes. This causes current to flow in the second electrodes 11b, 12b, 13b, and 14b, which function as detecting electrodes, at timings of a rise and a fall of the rectangular wave applied to the driving electrodes. Then, since a downward pressing force applied to any of the facing electrode pairs causes the amount of current to change, a current change detected by each of the second electrodes 11b, 12b, 13b, and 14b enables a change in the distance between the first electrode and the second electrode that constitute a facing electrode pair to be detected by the control unit 24. The control unit 24 determines whether a pressing force is being applied to any of the first electrodes by an operating body in accordance with the amount of change in the distance. More specifically, when the amount of change in the distance exceeds a predetermined value (a threshold), the control unit 24 determines that a pressing force is being applied. The magnitude of the pressing force change can also be determined. The magnitude of the pressing force can be determined as an analogue value regardless of the threshold definition described above.

When the capacitive input device 10 is switched to the second detection state, in accordance with the control performed by the control unit 24, the multiplexer 21 connects both the first electrode and the second electrode constituting one of the four facing electrode pairs 11, 12, 13, and 14 to the driving circuit 22 and connects all of the plurality of first electrodes and all of the plurality of second electrodes constituting the other facing electrode pairs to the detecting circuit 23. For example, the first electrode 11a and the second electrode 11b, which constitute the facing electrode pair 11, are connected to the driving circuit 22, and the first electrodes 12a, 13a, and 14a and the second electrodes 12b, 13b, and 14b, which constitute the facing electrode pairs 12, 13, and 14, respectively, are connected to the detecting circuit 23. In the second detection state, a rectangular-wave driving voltage having a fixed period is applied simultaneously to the first electrode and the second electrode that are connected to the driving circuit 22 and that function as driving electrodes. This causes current to flow in the first electrodes and the second electrodes that are connected to the detecting circuit 23 and that function as detecting electrodes at timings of a rise and a fall of the rectangular wave applied to the driving electrodes. Then, since the operating body approaching or touching any of the detecting electrodes causes the amount of current to change, changes in capacitance (mutual capacitance) between the driving electrodes and the detecting electrodes can be detected. Consequently, the coordinates of a position that the operating body approaches or touches can be determined with respect to the plurality of first electrodes 12a, 13a, and 14a disposed on the upper surface 151 of the first substrate 15a in accordance with the current change in each of the detecting electrodes.

In the second detection state, if the facing electrode pair to which the driving voltage is applied is changed at predetermined intervals, the coordinates of the position that the operating body approaches or touches can be determined over the whole area in which the first electrodes 11a, 12a, 13a, and 14a are disposed.

The embodiment configured as described above has the following effects.

(1) The four facing electrode pairs 11, 12, 13, and 14, each of which is constituted by the first electrode and the second electrode facing each other, are disposed. Switching between the first detection state in which whether a pressing force is applied to the first electrodes and the magnitude of the pressing force are determined and the second detection state in which a position that an operating body approaches or touches is detected enables sensitive and accurate detection in each of the detection states without increasing the spacing between the first substrate 15a and the second substrate 15b.

(2) In the second detection state, a facing electrode pair is connected as a unit to the driving unit or the detecting unit, and mutual capacitance is detected. Consequently, more accurate detection is possible compared with a case in which detection is performed using an electrode as a unit.

(3) The facing surfaces of the first electrode and the second electrode constituting a facing electrode pair have the same planar shape. This enables an operating body approaching, touching, or pressing the electrodes to be detected in the whole area corresponding to the electrodes, leading to rapid and certain detection.

(4) The first substrate 15a and the second substrate 15b face each other with the optically clear adhesive member 16, which is an elastic member, sandwiched therebetween. This enables a capacitance to be maintained constant when no operation is performed by the operating body, leading to stable detection.

Hereinafter, modifications will be described.

(A) In the embodiment described above, the optically clear adhesive member 16 is disposed between the first substrate 15a and the second substrate 15b. A nonconductive elastic member sandwiched between the first substrate 15a and the second substrate 15b is not limited to this, and a polymeric material (elastomer), for example, which has rubber elasticity at normal temperature, may be formed into a plate having the same planar area as the first substrate 15a and the second substrate 15b and disposed between the first substrate 15a and the second substrate 15b.

Further, a plurality of hemispherical elastic members 36, which have the same height and are made of the same material, may be disposed at regular intervals and sandwiched by the first substrate 15a and the second substrate 15b as illustrated by the sensing unit 30a of the capacitive input device according to a first modification, which is depicted in FIG. 2B. In this configuration, a space 37 is formed between the plurality of elastic members 36, and the elasticity of the elastic members 36 allows the first substrate 15a and the second substrate 15b to approach each other in the vertical direction. In addition, the space 37 allows the elastic members 36 to be deformed for a sufficient amount and to suppress the deformed elastic members 36 from protruding from the region sandwiched between the first substrate 15a and the second substrate 15b.

(B) In the embodiment described above, in the first detection state, the driving voltage is applied simultaneously to all of the first electrodes 11a, 12a, 13a, and 14a. Alternatively, the driving voltage may be applied to one of the first electrodes or a set of first electrodes among the first electrodes (for example, two of the first electrodes), and the one first electrode or the set of first electrodes to which the driving voltage is applied may be switched at predetermined intervals. In this case, one or more second electrodes that function as the detecting electrodes are one or more electrodes that constitute one or more facing electrode pairs with the one or more first electrodes to which the driving voltage is applied. Driving and detecting this way can reduce power consumption.

(C) In the embodiment described above, in the second detection state, the driving voltage is simultaneously applied to both the first electrode and the second electrode constituting one of the four facing electrode pairs 11, 12, 13, and 14, and mutual capacitance is detected by using, as the detecting electrodes, the plurality of first electrodes and the second electrodes that constitute the other facing electrode pairs. Alternatively, self capacitance may be detected. In the case where self capacitance is detected, both the first electrodes and the second electrodes that constitute one or more facing electrode pairs among the four facing electrode pairs 11, 12, 13, and 14 are connected to the driving circuit 22 and the detecting circuit 23. The electrodes connected to the driving circuit 22 have stray capacitance and are charged by the driving circuit 22. Because a human hand and finger are conductive, stray capacitance changes in accordance with the distances between the operating body and the electrodes. When the operating body approaches the electrodes, the levels of signals that are output from the electrodes to the detecting circuit 23 increase whereas the levels of the output signals decrease as the operating body moves away from the electrodes. In the case where self capacitance is detected, both driving and detecting can be performed by using one or more facing electrode pairs that are connected to the driving circuit 22 and the detecting circuit 23. Thus, detection may be simplified because, in contrast to the detection using mutual capacitance, detection using a facing electrode pair other than the facing electrode pair connected to the driving unit need not be performed, and the facing electrode pairs need not be switched in succession.

Figure 4:
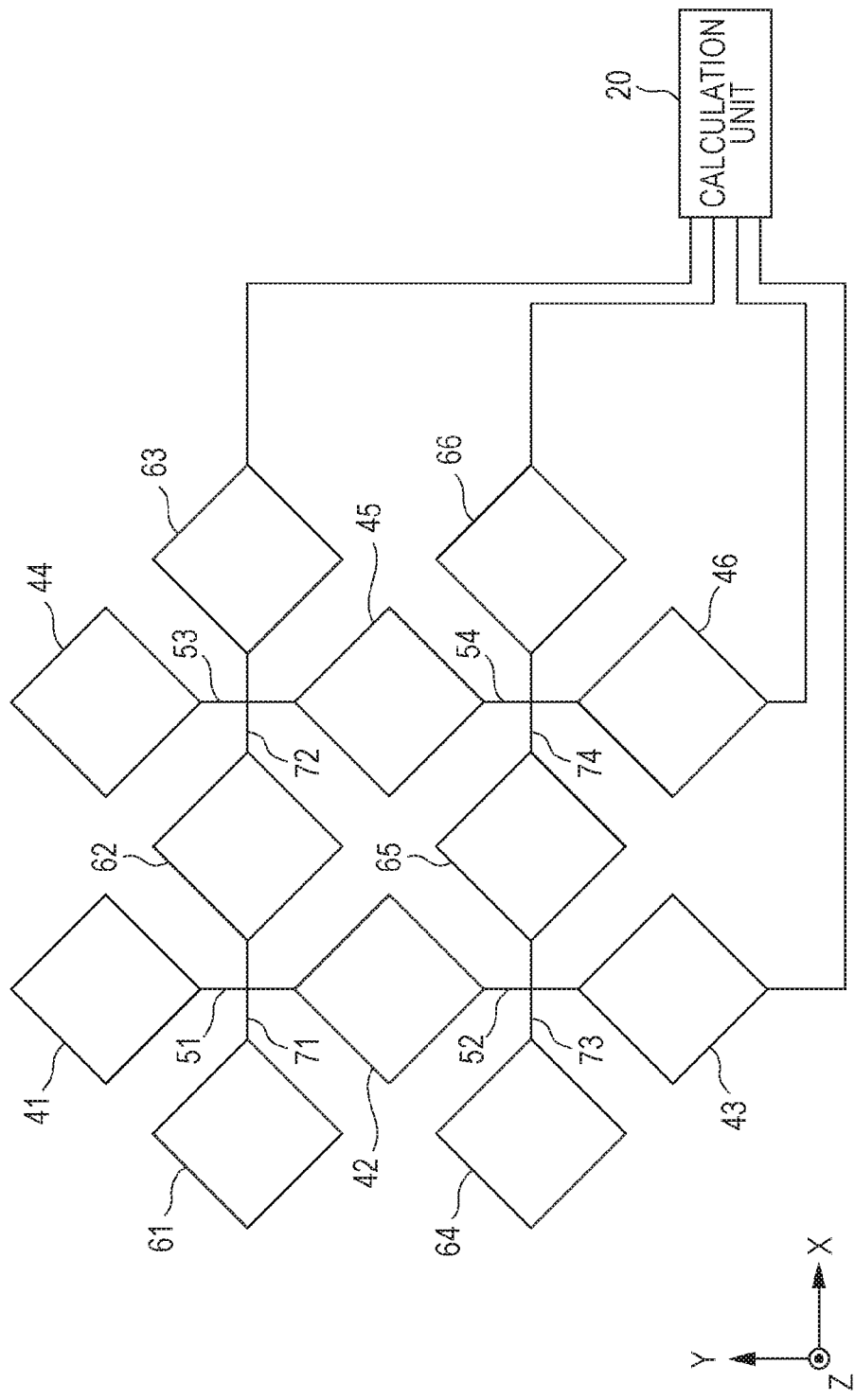
FIG. 4 is a plan view of an example layout of first electrodes of the capacitive input device according to a modification.

(D) In the embodiment described above, the first electrodes 11a, 12a, 13a, and 14a and the second electrodes 11b, 12b, 13b, and 14b are connected to the multiplexer 21 by using eight mutually independent wiring lines 18a to 18h. Alternatively, a plurality of first electrodes among the first electrodes may be connected to each other, and a plurality of second electrodes, each of which faces a corresponding one of the plurality of first electrodes that are connected to each other, may be connected to each other. For example, as depicted in FIG. 4, the first electrodes aligned in the Y direction may be connected to each other, and the first electrodes aligned in the X direction may be connected to each other. FIG. 4 is a plan view of an example layout of first electrodes of the capacitive input device according to a modification and depicts the first electrodes 41 to 46 and 61 to 66 formed on the upper surface 151 of the first substrate 15a and wiring lines connected to these electrodes.

In the example depicted in FIG. 4, the three rhombus-shaped first electrodes 41, 42, and 43 aligned in the Y direction are connected in series by using the wiring lines 51 and 52, and the three rhombus-shaped first electrodes 44, 45, and 46 are connected in series by using the wiring lines 53 and 54. In addition, the three rhombus-shaped first electrodes 61, 62, and 63 aligned in the X direction are connected in series by using the wiring lines 71 and 72, and the three rhombus-shaped first electrodes 64, 65, and 66 are connected in series by using the wiring lines 73 and 74. The wiring lines 51 and 52 intersect the wiring lines 71 and 73 and are insulated from the wiring lines 71 and 73, respectively. The wiring lines 53 and 54 intersect the wiring lines 72 and 74 and are insulated from the wiring lines 72 and 74, respectively. Each of the groups of electrodes thus connected to each other is connected to the calculation unit 20 as depicted in FIG. 4 and is caused to be connected to the driving circuit 22 or the detecting circuit 23 in accordance with the detection states.

Although not depicted in FIG. 4, a plurality of second electrodes are disposed on the second substrate 15b so as to face the respective first electrodes. As in the case of the first electrodes, the plurality of second electrodes include a plurality of electrodes that are aligned in the X direction and connected by wiring lines and a plurality of electrodes that are aligned in the Y direction and connected by wiring lines. In addition, in this case, intersecting wiring lines are insulated from each other.

In the first detection state, all of the first electrodes are connected to the driving circuit, and all of the second electrodes are connected to the detecting circuit. Alternatively, any of the rows of the first electrodes aligned in the Y direction or any of the rows of the first electrodes aligned in the X direction are connected to the driving circuit, and one or more rows of the second electrodes that face the row or rows of the first electrodes connected to the driving circuit are connected to the detecting circuit.

In the second detection state, for example, the first electrodes 61, 62, and 63 and the second electrodes that face the first electrodes 61, 62, and 63 are simultaneously connected to the driving circuit, and next, the first electrodes 64, 65, and 66 and the second electrodes that face the first electrodes 64, 65, and 66 are simultaneously connected to the driving circuit. Then, the first electrodes 41, 42, and 43 and the second electrodes that face the first electrodes 41, 42, and 43 are simultaneously connected to the detecting circuit, and next, the first electrodes 44, 45, and 46 and the second electrodes that face the first electrodes 44, 45, and 46 are simultaneously connected to the detecting circuit.

By connecting the electrodes in this manner, complex wiring and a resultant increase in the wiring area can be avoided, and an increase in the processing load of driving and detecting can be suppressed even in the case of a large number of electrodes. Although an example of a layout of a three-by-three array is depicted in FIG. 4, the numbers of rows and columns of the array are not limited to this example.

The present invention is described with reference to the aforementioned embodiment, and the present invention is not limited to the aforementioned embodiment. Improvements or changes can be made within the spirit of the present invention or for improvement purposes.

As described above, the capacitive input device according to the present invention is advantageous in that it can achieve both the acquisition of positional information of an operating body approaching or touching the top panel and the detection of a pressing force applied to the top panel.

What is claimed is:

1. A capacitive input device comprising:
    a first substrate;
    a second substrate facing the first substrate, the first substrate being approachable to the second substrate in accordance with an input operation of an operating body;
    a plurality of first electrodes formed on an upper surface of the first substrate;
    a plurality of second electrodes formed on a lower surface of the second substrate, each second electrode facing corresponding one of the plurality of first electrodes with the first and second substrate interposed therebetween, thereby forming a plurality of electrode pairs, each electrode pair including a first electrode and a corresponding second electrode; and
    a controller including:
        a driving circuit;
        a detecting circuit; and
        a switching unit configured to selectively connect each of the first electrodes and each of the second electrodes to the driving circuit or the detecting circuit, thereby providing a first detection mode and a second detection mode,
    wherein the first detection mode detects a change in a distance between each of the first electrodes and a corresponding one of the second electrodes, and the second detection mode determines a position which the operating body approaches or touches in accordance with detection outputs from the electrode pairs.

2. The capacitive input device according to claim 1,
    wherein, in the first detection mode, the switching unit connects the plurality of first electrodes to one of the driving circuit and the detecting circuit, and the plurality of second electrodes to the other of the driving circuit and the detecting circuit, and
    wherein, in the second detection mode, the switching unit selectively connects each electrode pair either to the driving circuit or to the detecting circuit.

3. The capacitive input device according to claim 2,
    wherein, in the first detection mode, the switching unit simultaneously connects all of the first electrodes of the electrode pairs to one of the driving circuit and the detecting circuit, and all of the second electrodes of the electrode pairs to the other of the driving circuit the detecting circuit.

4. The capacitive input device according to claim 3,
    wherein, in the second detection mode, the switching unit connects one of the electrode pairs to the driving circuit, and remaining electrode pairs to the detecting circuit, and
    wherein the position is determined in accordance with a change in mutual capacitance between the one electrode pair connected to the driving circuit and the remaining electrode pairs connected to the detecting circuit.

5. The capacitive input device according to claim 4,
    wherein, in the second detection mode, the switching unit sequentially selects the one electrode pair to be connected to the driving unit from among the electrode pairs.

6. The capacitive input device according to claim 3,
    wherein, in the second detection mode, the switching unit connects at least one of the electrode pairs to the driving circuit and the detecting circuit, thereby determining a position which the operating body approaches or touches in accordance with a change in self-capacitance of the at least one electrode pair detected by the detecting circuit.

7. The capacitive input device according to claim 2,
    wherein, in the first detection mode, the switching unit individually connects, in each electrode pair, the first electrode to one of the driving circuit and the detecting circuit and the second electrode to the other of the driving circuit and the detecting circuit.

8. The capacitive input device according to claim 7,
    wherein, in the second detection mode, the switching unit connects one of the electrode pairs to the driving circuit, and remaining electrode pairs to the detecting circuit, and
    wherein the position is determined in accordance with a change in mutual capacitance between the one electrode pair connected to the driving circuit and the remaining electrode pairs connected to the detecting circuit.

9. The capacitive input device according to claim 8,
    wherein, in the second detection mode, the switching unit sequentially selects the one electrode pair to be connected to the driving unit from among the electrode pairs.

10. The capacitive input device according to claim 7,
    wherein, in the second detection mode, the switching unit connects at least one of the electrode pairs to the driving circuit and the detecting circuit, thereby determining a position which the operating body approaches or touches in accordance with a change in self-capacitance of the at least one electrode pair detected by the detecting circuit.

11. The capacitive input device according to claim 2,
    wherein, in the second detection mode, the switching unit connects one of the electrode pairs to the driving circuit, and remaining electrode pairs to the detecting circuit, and
    wherein the position is determined in accordance with a change in mutual capacitance between the one electrode pair connected to the driving circuit and the remaining electrode pairs connected to the detecting circuit.

12. The capacitive input device according to claim 11, wherein, in the second detection mode, the switching unit sequentially selects the one electrode pair to be connected to the driving unit from among the electrode pairs.

13. The capacitive input device according to claim 2, wherein, in the second detection mode, the switching unit connects at least one of the electrode pairs to the driving circuit and the detecting circuit, thereby determining a position which the operating body approaches or touches in accordance with a change in self-capacitance of the at least one electrode pair detected by the detecting circuit.

14. The capacitive input device according to claim 1, wherein, in the second detection mode, the switching unit connects one of the electrode pairs to the driving circuit, and remaining electrode pairs to the detecting circuit, and
wherein the position is determined in accordance with a change in mutual capacitance between the one electrode pair connected to the driving circuit and the remaining electrode pairs connected to the detecting circuit.

15. The capacitive input device according to claim 14, wherein, in the second detection mode, the switching unit sequentially selects the one electrode pair to be connected to the driving unit from among the electrode pairs.

16. The capacitive input device according to claim 1, wherein, in the second detection model, the switching unit connects at least one of the electrode pairs to the driving circuit and the detecting circuit, thereby determining a position which the operating body approaches or touches in accordance with a change in self-capacitance of the at least one electrode pair detected by the detecting circuit.

17. The capacitive input device according to claim 1, wherein the first electrode and the second electrode in each electrode pair have a respective facing surface of a same planar shape.

18. The capacitive input device according to claim 1, further comprising:
an elastic member interposed between the first substrate and the second substrate.

* * * * *